United States Patent [19]

Hata et al.

[11] Patent Number: 5,540,771
[45] Date of Patent: Jul. 30, 1996

[54] CONCRETE PRODUCT USING AGGREGATES OBTAINED BY PULVERIZING MELT SLAGS AND THE METHOD OF FABRICATING THE SAME

[75] Inventors: Minoru Hata, Kyoto; Takeshi Tsunemi; Tohru Okui, both of Osaka, all of Japan

[73] Assignees: Keihan Concrete Co., Kyoto; Osaka Gas Co., Ltd.; Obayashi Corporation, both of Osaka, all of Japan

[21] Appl. No.: 505,999

[22] Filed: Jul. 24, 1995

Related U.S. Application Data

[62] Division of Ser. No. 345,555, Nov. 28, 1994, which is a continuation of Ser. No. 058,748, May 7, 1993, abandoned.

[30] Foreign Application Priority Data

May 9, 1992 [JP] Japan .................................. 4-143442

[51] Int. Cl.⁶ .............................. C04B 18/04; C04B 18/30
[52] U.S. Cl. .......................... 106/697; 106/714; 106/745; 106/789; 106/790; 264/333; 264/DIG. 43; 588/252; 588/257; 423/DIG. 18
[58] Field of Search ........................ 106/697, 700, 106/705, 745, 757, 789, 714, 790; 501/155; 588/252, 257; 423/DIG. 18; 264/333, DIG. 43

[56] References Cited

U.S. PATENT DOCUMENTS 3,030,222  4/1962  Eichenlaub ........................... 106/697

FOREIGN PATENT DOCUMENTS

| 2949528 | 6/1981 | Germany | 106/697 |
| 0008624 | 1/1979 | Japan | 106/697 |
| 1165931 | 10/1969 | United Kingdom | 106/697 |
| 1209296 | 10/1970 | United Kingdom | 106/697 |

OTHER PUBLICATIONS

*Design & Control of Concrete Mixtures*, Thirteenth Edition (1988) Kosmatka et al., Portland Cement & Assoc., pp. 30, 31, and 36 103–105.

Primary Examiner—Paul Marcantoni
Attorney, Agent, or Firm—Flynn, Thiel, Boutell & Tanis, P.C.

[57] ABSTRACT

A concrete product which uses 100% of the melt slags and pulverizes the melt slags into aggregates and fine powders, grinds the aggregates so that the percentage of absolute volume of the aggregates is over 60%, mixes the aggregates, fine powders, water and cement, and forms the mixture into the concrete product by vibration or press molding.

3 Claims, 4 Drawing Sheets

5,540,771

CONCRETE PRODUCT USING AGGREGATES OBTAINED BY PULVERIZING MELT SLAGS AND THE METHOD OF FABRICATING THE SAME

FIELD OF THE INVENTION

This application is a division of U.S. Ser. No. 08/345,555, filed Nov. 28, 1994, which is a continuation of U.S. Ser. No. 08/058,748, filed May 7, 1993, now abandoned.

The present invention relates to a concrete product which uses pulverized melt slags as aggregates, the melt slags being obtained by subjecting solid waste matters such as sewage sludge etc. to a heat melting process, and also to a method of fabricating the concrete product.

BACKGROUND OF THE INVENTION

Sewage sludge resulting from sewage treatment is often burned into ashes for disposal or into melt slags for reuse.

There has been proposed a recycling system of melt slags, in which the melt slags are pulverized so as to be reused as aggregates of a concrete product. According to this known method, melt slags are pulverized into large and small lumps to be mixed with regular aggregates for use as concrete aggregates.

Meanwhile, an interlocking block is well known as a pavement stone having a curved contact surface. The well-known interlocking block is regulated to have 50 kgf/cm$^2$ in flexural strength and 330 kgf/cm$^2$ in compressive strength at the time of shipment. The conventional aggregates obtained by pulverizing melt slags as set forth above cannot bear enough flexural strength and compressive strength when they are used in the interlocking blocks, so that they are usually mixed with regular aggregates.

As described above, since the aggregates obtained by pulverizing melt slags reduce the flexural and compressive strength of a concrete product which requires a given flexural and compressive strength, they cannot constitute the whole aggregates. Consequently, as a matter of fact the aggregates obtained by pulverizing melt slags are mixed with regular aggregates (gathered in classification by cracking stones or from earth and sand in riverbeds or sea coasts) up to about a third of the whole aggregates according to the conventional recycling system. Accordingly, the conventional system which uses aggregates obtained by pulverizing melt slags is not capable of recycling a large amount of melt slags since it can make use of only a little amount of melt slags. Moreover, even if the recycled aggregates are mixed with regular ones, the resulting concrete products are inevitably reduced in strength.

Furthermore, there arises another problem that the aggregates obtained by pulverizing melt slags as set forth above produces a secondary waste matter of fine powders which are produced in the pulverization process, since the fine powders is not used in the conventional method.

Accordingly, it is an object of the present invention to solve the drawbacks of the prior art set forth above and provide a concrete product which uses aggregates obtained by pulverizing melt slags or pellets and which is hardly reduced in the flexural and compressive strength thereof and does not produce the secondary waste matter since it uses 100% of the melt slags, and to provide a method of fabricating the same.

SUMMARY OF THE INVENTION

The concrete product according to the present invention is characterized in being composed of coarse aggregates, fine aggregates, fine powders, water and cement which are mixed together and finished by vibration or press moldings, wherein the coarse and fine aggregates are obtained by pulverizing melt slags and subjecting the same to a secondary process of grinding, while the fine powders are generated in the pulverizing or grinding process.

The method of fabricating the concrete product according to the present invention is characterized in comprising the steps of pulverizing the melt slags of sewage sludge into coarse aggregates, fine aggregates and fine powders, subjecting the coarse and fine aggregates to a grinding process so as to make the percentage of absolute volume thereof more than 60%, mixing the above elements with water and cement with a mix ratio of from 0 to 12.0 parts by weight of the coarse aggregates, from 7.0 to 20.0 parts by weight of the fine aggregates, 1.0 parts by weight of the fine powder, from 0.7 to 3.5 parts by weight of water and from 2.5 to 6.0 parts by weight of cement, and subjecting the mixture to vibration or press molding.

DETAILED DESCRIPTION

An embodiment of the present invention will be described hereinafter with reference to the drawings.

Figure 1:
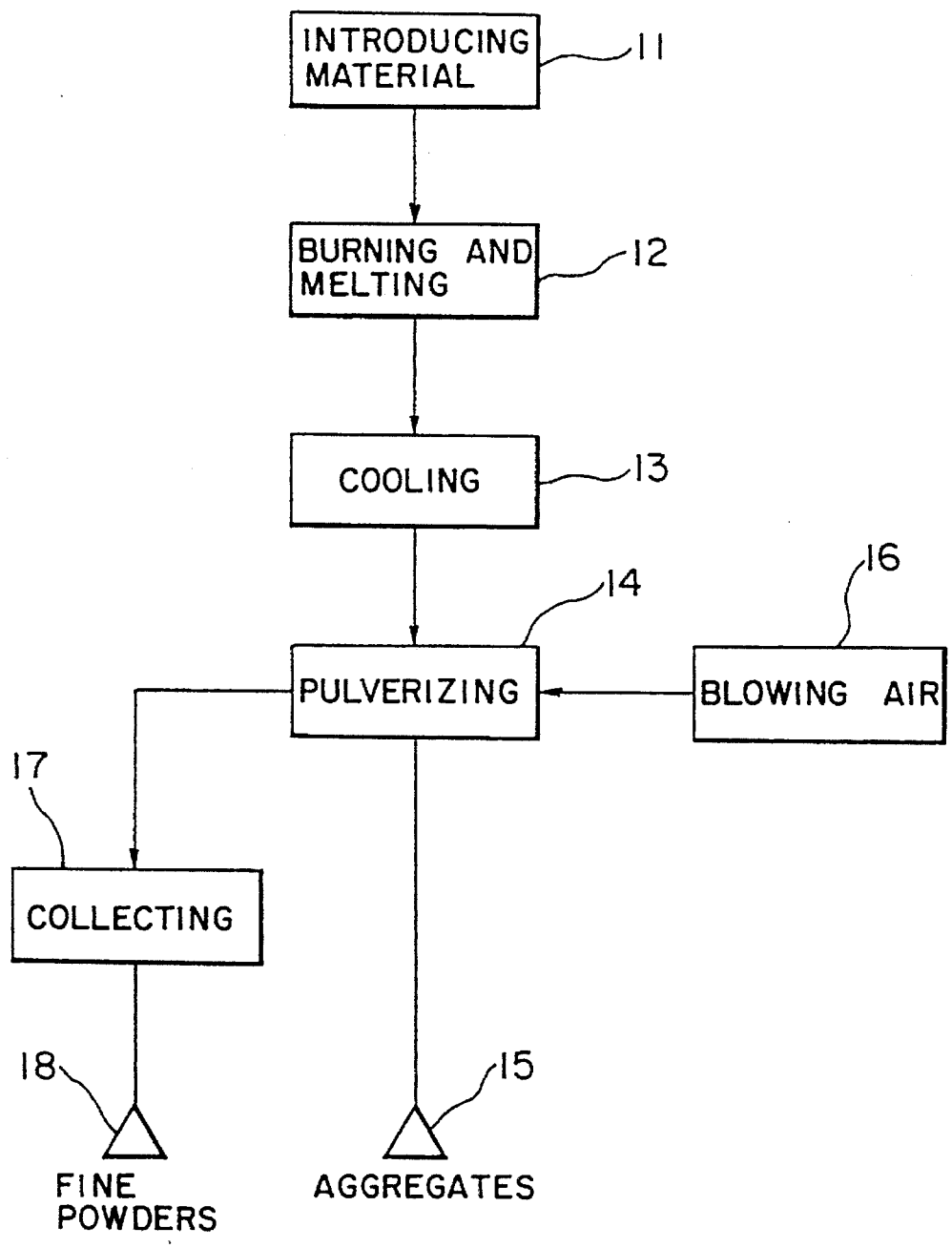
FIG. 1 is a flowchart showing the pulverization process of melt slags according to an embodiment of the present invention.

FIG. 1 is a flowchart showing the pulverization process for melt slags according to an embodiment of the present invention.

Although the following description deals with the processing of melt slags or pellets of sewage sludge, the melt slags used in the present invention are not limited to incineration melt slags of sewage sludge, but includes other inflammable solid waste matters such as the incineration residue of city refuse, etc.

When the sewage sludge is made into melt slags or pellets, the sewage sludge is dried in a drier and thereafter is burned and melted in a melting furnace so as to be directly made into melt slags. The present invention, however, includes not only such melt slags, but also those made by burning the sewage sludge to ash in a pre-processing step and thereafter subjecting the ash to a melting process.

Referring to FIG. 1, material 11 dried by a drier, not shown, (or previously burned to ash), is introduced into a melting furnace 12 so as to be subjected to a melting process. The melted slags are introduced into a cooling device 13. The melted slags or pellets introduced into the cooling device 13 are reduced in size owing to thermal contraction so that almost all of the melt slags or pellets have diameters of less than 150 mm. These melt slags are introduced into an aggregate maker 14.

The melt slugs or pellets introduced into the aggregate maker 14 are pulverized and subjected to a grinding process and discharged as final aggregates 15. Moreover, fine powders produced in the aggregate maker 14 are transferred to a dust collector 17 by air supplied from a blower 16 so as to be stored as fine powders 18 therein.

Figure 2:
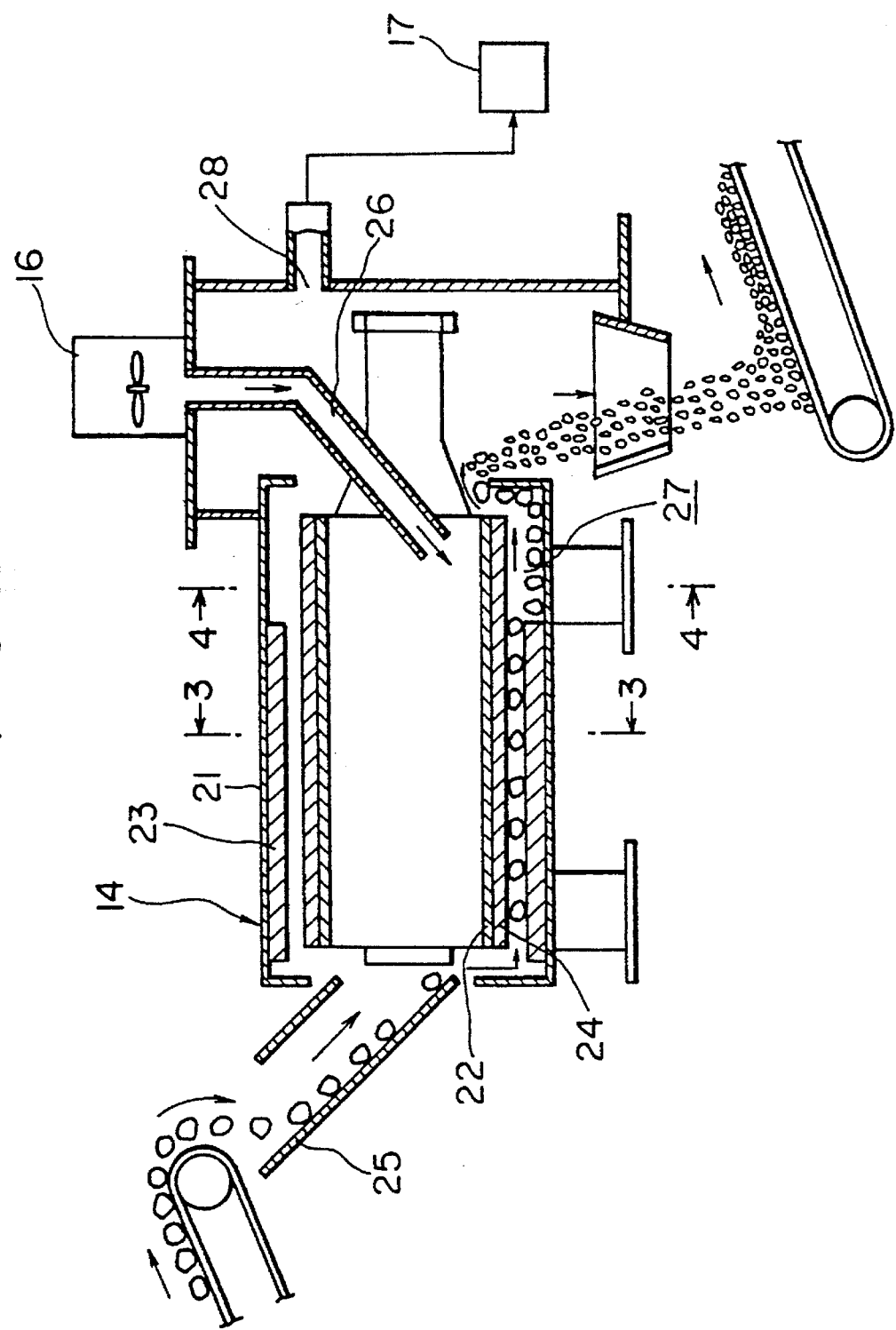
FIG. 2 is a cross-sectional view showing an embodiment of an aggregate maker according to the present invention.
Figure 3:
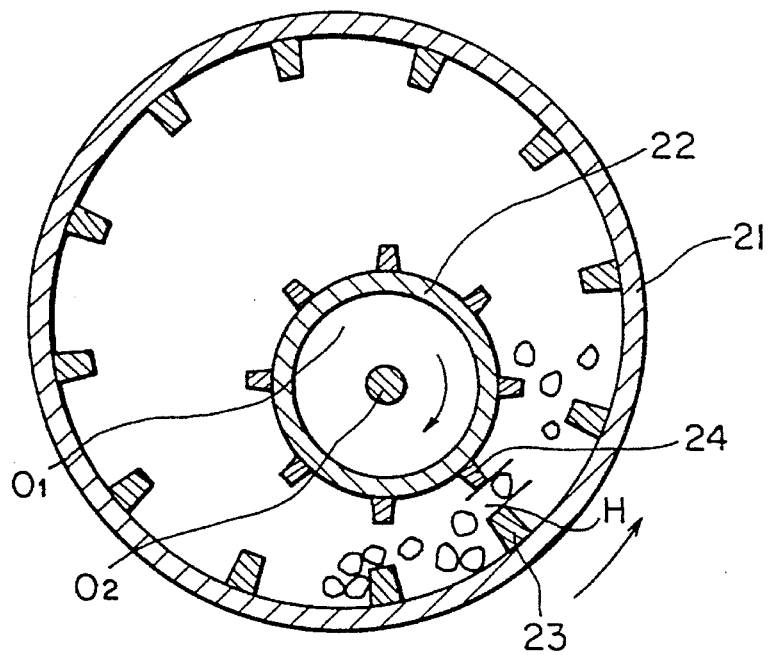
FIG. 3 is a cross-sectional view of the aggregate maker taken along the line 3—3 in FIG. 2.
Figure 4:
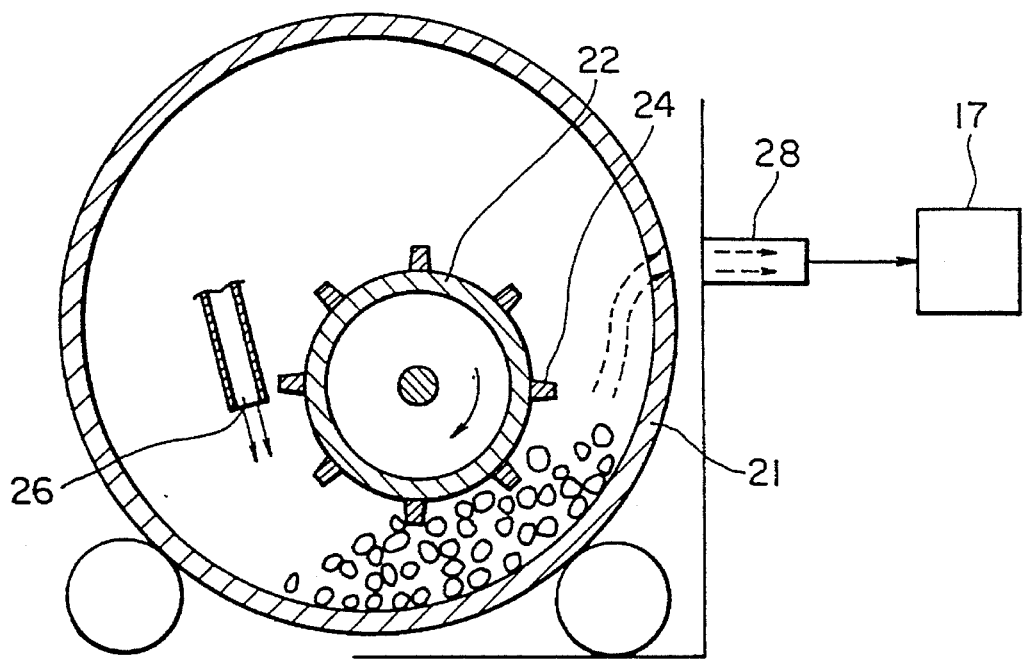
FIG. 4 is a cross-sectional view of the aggregate maker taken along the line 4—4 in FIG. 2.

The aggregate maker 14 has a construction as illustrated in FIGS. 2 to 4.

That is, the aggregate maker 14 is composed of double drums which rotate reversely to each other, with the inner rotating drum 22 being arranged inside the outer rotating drum 21. The axis $O_1$ of the outer rotating drum 21 and the axis of $O_2$ of the inner rotating drum 22 are eccentric to each other, and the minimum gap H between the opposed drum liners, described later, is adjusted by changing the amount of eccentricity. A plurality of lugs or liners 23 project from the inner circumferential surface of the outer rotating drum 21, and a plurality of lugs or liners 24 also project from the outer circumferential surface of the inner rotating drum 22. The lugs 23 and 24 are elongated axially of the respective drums, and are spaced circumferentially therearound. The melt slags or pellets to be pulverized are introduced into the outer rotating drum 21 from a chute 25, and are pulverized by the liners 23 and 24 between the outer rotating drum 21 and the inner rotating drum 22 as illustrated in FIG. 3. The diameters of aggregates obtained by pulverizing the melt slags are determined by the gap H between the liners 23 and 24. When the gap H is large, the diameters of aggregates are large, while when the gap H is small, the diameters of aggregates are small. Since the liners 23 provided on the outer rotating drum 21 extend about halfway along the whole axial length thereof, the aggregates are transferred to a stirring and grinding space 27 adjacent one end of the drum to be stirred and ground therein by the liners 24 of the inner rotating drum 22 after the aggregates are pulverized by the liners 23 and 24 so that each of the aggregates becomes smooth and round as a whole. The aggregates are discharged from the end edge portion of the outer rotating drum 21 after grinding. A draft air duct 26 has an opening inside the edge portion of the inner rotating drum 22 for sending air thereinto by the blower 16, thereby to send the fine powders into the dust collecting device 17 through an outlet duct 28. The aggregate maker 14 is closed at the edge portion thereof so as to prevent the fine powders from being discharged outside.

Although the inner and outer rotating drums are designed to rotate in directions which are reverse to each other for improving the pulverization efficiency in the aggregate maker set forth above, the aggregate maker employed by the present invention is not limited to the above embodiment, but may be constructed variously. For example, the outer rotating drum may be fixed while the inner rotating drum alone is rotated, the outer rotating drum may be rotated while the inner rotating drum is fixed, or both of the outer and inner rotating drums may be rotated in the same direction with different speeds, etc.

As a preferable shape of the aggregates, each aggregate needs to be smooth and round as a whole without any projection thereon. Accordingly, the characteristic of the aggregate is usually represented by measuring the percentage of absolute volume thereof in order to indicate each aggregate shape. The percentage of absolute volume indicates a volume per unit weight, which is represented as 100% when the volume (as determined by the volume of a container in which the aggregate sample is placed) is completely filled up without any gaps therein (i.e. gaps between the aggregates). A concrete product using aggregates having a small percentage of absolute volume is lower in flexural and compressive strength.

The percentage of absolute volume of aggregates obtained by pulverizing melt slugs by a conventional pulverization device ranges from 56 to 57%.

On the other hand, when the percentage of absolute volume of aggregates which are subjected to the stirring and grinding processes after pulverization as in the above aggregate maker 14 was measured, it was 63%. The percentage of absolute volume of 63% is improved by 6 to 7 percentage points compared with those ranging from 56 to 57% of the melt slags aggregates obtained by pulverizing the melt slags set forth above by a conventional pulverization device. When the former are used as aggregates of a concrete product, they remarkably improve the concrete product in flexural and compressive strength.

Figure 5:
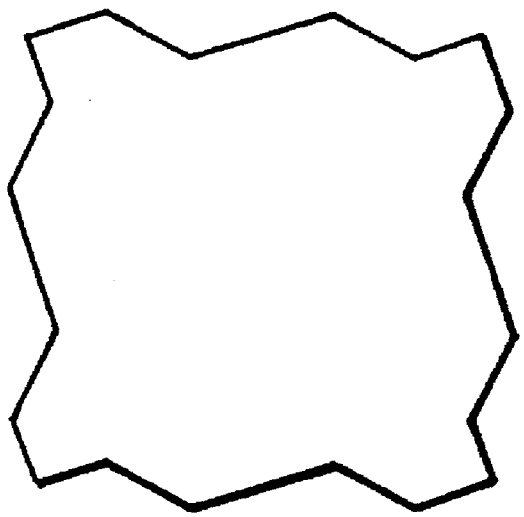
FIG. 5 is a plan view of one shape of an interlocking block or tile manufactured by the present invention.

An interlocking block (one shape of which is shown in FIG. 5) was made using the aggregates having the percentage of absolute volume of 63% as set forth above and its flexural and compressive strength were measured. At that time, the mix ratio and fabricating method were as follows.

That is, the amounts of elements in weight per cubic meters were as follows; water was 135 kg, cement was 450 kg, coarse aggregates having comparatively large diameters (greater than 5 mm $\phi$) were 450 kg, aggregates having comparatively small diameters (0.5 to 5 mm $\phi$) were 1150 kg, and fine powders (less than 0.15 mm $\phi$) was 100 kg, and the fabricating method involved vibration and press molding of the product.

As a result, the flexural strength was 61.2 kgf/cm$^2$ and the compressive strength was 482 kgf/cm$^2$. These values are high enough compared with the practical standard values of an interlocking block, of which the flexural strength is 50 kgf/cm$^2$ and the compressive strength is 330 kgf/cm$^2$, so that they do not cause any trouble in practical use.

The factors of aggregates which strongly influence the flexural and compressive strength of a concrete product are the percentage of absolute volume and the mix ratio.

The inventors of the present invention confirmed that when the percentage of absolute volume is over 60%, the flexural and compressive strength of the concrete product according to the present invention greatly exceed those obtained by conventional melt slag aggregates and do not cause any trouble in practical use.

After various experiments, the inventors also confirmed that the mix ratio of the aggregates, cement and water is not limited to that described above and also confirmed that the concrete product comprising the mixture of coarse aggregates, fine aggregates, water and cement with the mix ratio of from 0 to 12.0 parts by weight of the coarse aggregates, from 7.0 to 20.0 parts by weight of the fine aggregates, from 0.7 to 3.5 parts by weight of water and from 2.5 to 6.0 parts by weight of cement per 1.0 part by weight of fine powders can also result in adequate strength (flexural and compressive strength).

As described above, the present invention serves as an epoch-making recycling system of melt slags or pellets since 100% of melt slags can be used and the concrete product obtained therefrom has enough flexural and compressive strength.

As a result, the present invention has the following effects:

It is good as a recycling system since it can reuse 100% of melt slags of sewage sludge.

It is optimum for a recycling system since it also makes use of the fine powders produced by the pulverization thereby preventing the production of the secondary waste matter resulting from the pulverization.

It is useful and practically does not cause any trouble for fabricating interlocking blocks as a concrete product, since the product exceeds given values in flexural and compressive strength.

If an aggregate maker illustrated in FIG. 2 is employed, no particularly difficult operation is needed for improving the percentage of absolute volume of aggregates, since the stirring and grinding processes of the aggregates can be easily performed in the same aggregate maker.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of fabricating a concrete product using aggregates and fine powder provided solely from melt slag, comprising the steps of:

pulverizing melt slags into coarse aggregates, fine aggregates, and fine powders;

subjecting the coarse and fine aggregates to a grinding process so as to have a percentage of absolute volume thereof of more than 60%;

mixing the coarse aggregates, the fine aggregates, and fine powders with water and cement with the ratio of from 0 to 12.0 parts by weight of the coarse aggregates, from 7.0 to 20.0 parts by weight of the fine aggregates, 1.0 parts by weight of the fine powders, from 0.7 to 3.5 parts by weight of water and from 2.5 to 6.0 parts by weight of cement; and subjecting the mixture to vibration or press molding to obtain a concrete product having a flexural strength of at least 61.2 kgf/cm$^2$ and a compressive strength of at least 482 kgf/cm$^2$.

2. A method of fabricating a concrete product according to claim 1, wherein the melt slags are made from sewage sludge.

3. A method of fabricating a concrete product according to claim 1, wherein the percentage of absolute volume is at least 63%.

* * * * *